(12) United States Patent
Creel et al.

(10) Patent No.: US 7,690,429 B2
(45) Date of Patent: Apr. 6, 2010

(54) METHODS OF USING A SWELLING AGENT IN A WELLBORE

(75) Inventors: Prentice G. Creel, Odessa, TX (US); B. Raghava Reddy, Duncan, OK (US); Edlon D. Dalrymple, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 1264 days.

(21) Appl. No.: 10/970,444

(22) Filed: Oct. 21, 2004

(65) Prior Publication Data

US 2006/0086501 A1  Apr. 27, 2006

(51) Int. Cl.
  *E21B 33/13* (2006.01)
  *E21B 43/26* (2006.01)
(52) U.S. Cl. ............... 166/300; 166/279; 166/283; 166/293; 166/307; 166/308.5
(58) Field of Classification Search .................. None
  See application file for complete search history.

(56) References Cited

U.S. PATENT DOCUMENTS

| | | | |
|---|---|---|---|
| 2,649,160 A | 8/1953 | Williams et al. | |
| 2,848,051 A | 8/1958 | Williams | 166/291 |
| 2,890,752 A | 6/1959 | Crone et al. | |
| 3,132,693 A | 5/1964 | Weisend | |
| 3,202,214 A | 8/1965 | McLaughlin, Jr. | 166/30 |
| 3,215,634 A | 11/1965 | Walker | |
| 3,247,171 A | 4/1966 | Walker at al. | |
| 3,284,393 A | 11/1966 | Vanderhoff, et al. | |
| 3,302,717 A | 2/1967 | West at al. | |
| 3,306,870 A | 2/1967 | Eilers at al. | |
| 3,375,872 A | 4/1968 | McLaughlin at al. | |
| 3,376,926 A | 4/1968 | McLaughlin | 166/29 |
| 3,447,608 A | 6/1969 | Fry et al. | |
| 3,448,800 A | 6/1969 | Parker et al. | |
| 3,464,494 A | 9/1969 | McLaughlin | |
| 3,493,529 A | 2/1970 | Krottinger, et al. | |
| 3,556,221 A | 1/1971 | Haws et al. | |
| 3,721,295 A | 3/1973 | Bott | |
| 3,724,547 A | 4/1973 | Bott | |
| 3,818,998 A | 6/1974 | Hessert | 175/72 |
| 3,893,510 A | 7/1975 | Elphingstone et al. | |
| 3,918,523 A | 11/1975 | Stuber | 166/285 |
| 3,953,336 A | 4/1976 | Daigle | 252/8.5 A |
| 3,959,003 A | 5/1976 | Ostroot et al. | |
| 4,034,809 A | 7/1977 | Phillips et al. | |
| 4,069,062 A | 1/1978 | Bürge | |
| 4,083,407 A | 4/1978 | Griffin, Jr. | 166/291 |
| 4,120,361 A | 10/1978 | Threlkeld et al. | |
| 4,172,066 A | 10/1979 | Zweigle et al. | 260/29.6 TA |
| 4,182,417 A | 1/1980 | McDonald et al. | |
| 4,191,254 A | 3/1980 | Baughman et al. | |
| 4,202,413 A | 5/1980 | Messenger | 166/292 |
| 4,205,611 A | 6/1980 | Slawinski | |
| 4,232,741 A | 11/1980 | Richardson et al. | |
| 4,235,291 A | 11/1980 | Messenger | 166/292 |
| 4,248,304 A | 2/1981 | Phillips | |
| 4,276,935 A | 7/1981 | Hessert et al. | |
| 4,282,928 A | 8/1981 | McDonald et al. | |
| 4,299,710 A | 11/1981 | Dupre et al. | 252/8.5 A |
| 4,304,298 A | 12/1981 | Sutton | |
| 4,340,427 A | 7/1982 | Sutton | |
| 4,367,093 A | 1/1983 | Burkhalter et al. | |
| 4,391,925 A | 7/1983 | Mintz et al. | |
| 4,450,010 A | 5/1984 | Burkhalter et al. | |
| 4,463,808 A | 8/1984 | Mason et al. | |
| 4,466,831 A | 8/1984 | Murphey | 106/74 |
| 4,478,640 A | 10/1984 | Holland | 106/76 |
| 4,487,864 A | 12/1984 | Bermudez et al. | |
| 4,507,154 A | 3/1985 | Burge et al. | 106/315 |
| 4,515,216 A | 5/1985 | Childs et al. | 166/293 |
| 4,565,578 A | 1/1986 | Sutton et al. | |
| 4,572,295 A | 2/1986 | Walley | 166/295 |
| 4,579,668 A | 4/1986 | Messenger | 252/8.5 LC |

(Continued)

FOREIGN PATENT DOCUMENTS

CA  CN 1348932  5/2002

(Continued)

OTHER PUBLICATIONS

Baroid brochure entitled "DIAMOND SEAL™ Absorbent Polymer For Lost Circulation" dated 2000.

(Continued)

*Primary Examiner*—Zakiya W. Bates
(74) *Attorney, Agent, or Firm*—Craig W. Roddy; Conley Rose, P.C.

(57) ABSTRACT

In an embodiment, a sealant composition comprising a swelling agent is displaced into a wellbore penetrating a subterranean formation to maintain isolation of the formation. The sealant composition may be displaced into a permeable zone through which fluid can undesirably migrate. In another embodiment, the sealant composition comprising the swelling agent is displaced into the wellbore to reduce a loss of a fluid to the formation during circulation of the fluid in the wellbore. The fluid may be, for example, a drilling fluid, a secondary sealant composition, a fracturing fluid, or combinations thereof. The sealant composition may be displaced into a flow pathway through which fluid can undesirably migrate into the formation. In both embodiments, the swelling agent contacts water such that it swells and thereby reduces fluid flow through the permeable zone/flow pathway. The swelling agent may comprise a crosslinked co-polymer.

61 Claims, No Drawings

U.S. PATENT DOCUMENTS

| | | | |
|---|---|---|---|
| 4,588,031 A | 5/1986 | Oliver, Jr. et al. | |
| 4,635,726 A | 1/1987 | Walker | |
| 4,646,834 A | 3/1987 | Bannister | 166/291 |
| 4,664,816 A | 5/1987 | Walker | 252/8.512 |
| 4,670,501 A | 6/1987 | Dymond et al. | |
| 4,690,996 A | 9/1987 | Shih et al. | |
| 4,704,213 A | 11/1987 | Delhommer et al. | 252/8.512 |
| 4,706,755 A | 11/1987 | Roark et al. | |
| 4,724,906 A | 2/1988 | Sydansk | 166/295 |
| 4,730,674 A | 3/1988 | Burdge et al. | 166/295 |
| 4,777,200 A | 10/1988 | Dymond et al. | |
| 4,818,288 A | 4/1989 | Aignesberger et al. | |
| 4,836,940 A | 6/1989 | Alexander | |
| 4,886,550 A | 12/1989 | Alexander | 106/74 |
| 4,896,724 A | 1/1990 | Hazlett et al. | |
| 4,899,819 A | 2/1990 | Hazlett et al. | |
| 4,941,533 A | 7/1990 | Buller et al. | 166/252 |
| 4,961,760 A | 10/1990 | Caskey et al. | |
| 4,961,790 A | 10/1990 | Smith et al. | |
| 4,964,918 A | 10/1990 | Brown et al. | |
| 4,989,673 A | 2/1991 | Sydansk | |
| 5,002,127 A | 3/1991 | Dalrymple et al. | |
| 5,034,139 A | 7/1991 | Reid et al. | |
| 5,078,212 A | 1/1992 | Boyle et al. | |
| 5,086,841 A | 2/1992 | Reid et al. | |
| 5,089,538 A | 2/1992 | Iizuka et al. | |
| 5,106,516 A | 4/1992 | Mueller et al. | |
| 5,120,367 A | 6/1992 | Smith et al. | |
| 5,145,012 A | 9/1992 | Hutchins et al. | |
| 5,232,910 A | 8/1993 | Mueller et al. | |
| 5,252,554 A | 10/1993 | Mueller et al. | |
| 5,318,954 A | 6/1994 | Mueller et al. | |
| 5,346,012 A | 9/1994 | Heathman et al. | |
| 5,351,759 A | 10/1994 | Nahm et al. | 166/293 |
| 5,385,206 A | 1/1995 | Thomas | |
| 5,421,410 A | 6/1995 | Irani | |
| 5,439,057 A | 8/1995 | Weaver et al. | 166/295 |
| 5,447,197 A | 9/1995 | Rae et al. | |
| 5,465,792 A | 11/1995 | Dawson et al. | |
| 5,476,142 A | 12/1995 | Kajita | 166/294 |
| 5,512,096 A | 4/1996 | Krause | |
| 5,547,506 A | 8/1996 | Rae et al. | |
| 5,550,189 A | 8/1996 | Qin et al. | 525/54.3 |
| 5,588,488 A | 12/1996 | Vijn et al. | |
| 5,591,701 A | 1/1997 | Thomas | |
| 5,707,443 A | 1/1998 | Brown et al. | 106/713 |
| 5,718,292 A | 2/1998 | Heathman et al. | |
| 5,735,349 A | 4/1998 | Dawson et al. | |
| RE36,066 E | 1/1999 | Mueller et al. | |
| 5,881,826 A | 3/1999 | Brookey | |
| 5,913,364 A | 6/1999 | Sweatman | |
| 5,921,319 A | 7/1999 | Curtice | |
| 6,060,434 A | 5/2000 | Sweatman et al. | |
| 6,123,159 A | 9/2000 | Brookey et al. | |
| 6,148,917 A | 11/2000 | Brookey et al. | |
| 6,156,708 A | 12/2000 | Brookey et al. | |
| 6,167,967 B1 | 1/2001 | Sweatman | |
| 6,169,058 B1 | 1/2001 | Le et al. | |
| 6,187,839 B1 | 2/2001 | Eoff et al. | |
| 6,218,343 B1 | 4/2001 | Burts, Jr. | 507/225 |
| 6,258,757 B1 | 7/2001 | Sweatman et al. | |
| 6,390,208 B1 | 5/2002 | Brookey | |
| 6,405,801 B1 | 6/2002 | Vijn et al. | |
| 6,431,282 B1 | 8/2002 | Bosma et al. | |
| 6,457,523 B1 | 10/2002 | Vijn et al. | |
| 6,460,632 B1 | 10/2002 | Chatterji et al. | |
| 6,465,397 B1 | 10/2002 | Patterson | 507/222 |
| 6,508,306 B1 | 1/2003 | Reddy et al. | 166/295 |
| 6,516,881 B2 | 2/2003 | Hailey, Jr. | 166/278 |
| 6,516,882 B2 | 2/2003 | McGregor et al. | 166/278 |
| 6,518,224 B2 | 2/2003 | Wood | |
| 6,554,081 B1 | 4/2003 | Brooks et al. | |
| 6,561,269 B1 | 5/2003 | Brown et al. | |
| 6,581,701 B2 | 6/2003 | Heying | 175/72 |
| 6,610,140 B2 | 8/2003 | Vi | |
| 6,616,753 B2 | 9/2003 | Reddy et al. | |
| 6,626,992 B2 | 9/2003 | Vijn et al. | |
| 6,631,766 B2 | 10/2003 | Brothers et al. | 166/293 |
| 6,655,475 B1 | 12/2003 | Wald | |
| 6,702,044 B2 | 3/2004 | Reddy et al. | |
| 6,708,760 B1 | 3/2004 | Chatterji et al. | |
| 6,715,553 B2 | 4/2004 | Reddy et al. | |
| 6,716,797 B2 | 4/2004 | Brookey | |
| 6,722,433 B2 | 4/2004 | Brothers et al. | |
| 6,722,434 B2 | 4/2004 | Reddy et al. | |
| 6,730,636 B2 | 5/2004 | Vijn et al. | |
| 6,767,867 B2 | 7/2004 | Chatterji et al. | 507/216 |
| 6,770,601 B1 | 8/2004 | Brookey | |
| 6,777,377 B2 * | 8/2004 | Myers et al. | 507/120 |
| 6,800,593 B2 | 10/2004 | Dobson, Jr. et al. | |
| 6,858,566 B1 | 2/2005 | Reddy et al. | |
| 6,887,832 B2 | 5/2005 | Kirsner et al. | |
| 7,156,174 B2 | 1/2007 | Roddy et al. | |
| 7,204,312 B2 | 4/2007 | Roddy et al. | |
| 2001/0018975 A1 | 9/2001 | Richardson | |
| 2002/0040812 A1 | 4/2002 | Heying | |
| 2002/0170717 A1 | 11/2002 | Venning et al. | 166/369 |
| 2002/0188040 A1 | 12/2002 | Chen et al. | 524/35 |
| 2003/0008779 A1 | 1/2003 | Chen et al. | 507/200 |
| 2003/0062170 A1 | 4/2003 | Slack | 166/377 |
| 2003/0066651 A1 | 4/2003 | Johnson | 166/369 |
| 2003/0075315 A1 | 4/2003 | Nguyen et al. | 166/51 |
| 2003/0092582 A1 | 5/2003 | Reddy et al. | |
| 2003/0144153 A1 | 7/2003 | Kirsner et al. | |
| 2003/0181338 A1 | 9/2003 | Sweatman et al. | |
| 2003/0186819 A1 | 10/2003 | Shaarpopur | |
| 2003/0201103 A1 | 10/2003 | Brookey et al. | |
| 2004/0069537 A1 | 4/2004 | Reddy et al. | |
| 2004/0069538 A1 | 4/2004 | Reddy et al. | |
| 2004/0108141 A1 | 6/2004 | Reddy et al. | |
| 2004/0168798 A1 | 9/2004 | Creel et al. | 166/270 |
| 2004/0168801 A1 | 9/2004 | Reddy et al. | |
| 2004/0168802 A1 | 9/2004 | Creel et al. | 166/293 |
| 2004/0168804 A1 | 9/2004 | Reddy et al. | 166/295 |
| 2004/0168830 A1 | 9/2004 | Reddy et al. | |
| 2004/0171499 A1 | 9/2004 | Ravi et al. | |
| 2004/0180794 A1 | 9/2004 | Reddy et al. | |
| 2004/0221990 A1 | 11/2004 | Heathman et al. | |
| 2004/0221991 A1 | 11/2004 | Brothers et al. | |
| 2005/0009710 A1 | 1/2005 | Heatman et al. | |
| 2005/0032652 A1 | 2/2005 | Kirsner et al. | |
| 2005/0051363 A1 | 3/2005 | Munoz, Jr. et al. | |
| 2005/0061505 A1 | 3/2005 | Caveny et al. | |
| 2005/0098317 A1 | 5/2005 | Reddy et al. | |
| 2005/0113260 A1 | 5/2005 | Wood | |
| 2005/0113262 A1 | 5/2005 | Ravi et al. | |
| 2005/0124502 A1 | 6/2005 | Shaarpour | |
| 2005/0199401 A1 | 9/2005 | Patel et al. | |
| 2006/0084580 A1 * | 4/2006 | Santra et al. | 507/239 |
| 2006/0211580 A1 | 9/2006 | Wang et al. | |
| 2006/0213662 A1 | 9/2006 | Creel et al. | |
| 2007/0012447 A1 | 1/2007 | Fang et al. | |

FOREIGN PATENT DOCUMENTS

| | | |
|---|---|---|
| CA | CN1364739 | 8/2002 |
| CN | 1999 9 | 2/1999 |
| CN | 2003 6 | 6/2003 |
| DE | 217796 | 1/1985 |
| DE | 100 37 118 | 2/2002 |
| EP | 0 401 936 A2 | 12/1990 |
| EP | 0530768 A1 | 3/1993 |
| EP | 1 188 726 A2 | 3/2002 |
| EP | 0 566 118 B2 | 10/2002 |

| | | | |
|---|---|---|---|
| EP | 1 316 540 A2 | 6/2003 |
| GB | 2271350 A | 4/1994 |
| GB | 2 371 319 | 7/2002 |
| JP | 53-62308 | 6/1978 |
| JP | 60235863 | 11/1985 |
| JP | 559886 A | 3/1993 |
| JP | 10088508 A | 4/1996 |
| JP | 10088508 | 4/1998 |
| JP | 2000-272943 | 10/2000 |
| JP | 2001146457 A | 5/2001 |
| RU | 2 177 539 | 10/1999 |
| RU | 2160822 C2 | 12/2000 |
| SU | 953187 | 8/1982 |
| SU | 1723312 | 3/1992 |
| WO | WO 84/01943 | 5/1984 |
| WO | 9916723 A1 | 4/1999 |
| WO | 0174967 A1 | 10/2001 |
| WO | WO 02/084070 | 10/2002 |
| WO | WO 2004/101463 A2 | 11/2004 |
| WO | WO 2004/101463 A3 | 11/2004 |
| WO | WO 2004/101951 A1 | 11/2004 |
| WO | WO 2004/101952 A1 | 11/2004 |

OTHER PUBLICATIONS

Halliburton brochure entitled "FLO-CHEK® A Additive" dated 1999.
Paper entitled "Inflow Analysis and Optimization of Slotted Liners" by T.M.V. Kaiser et al., dated 2002.
Foreign communication from a related counterpart application dated Jul. 12, 2004.
Foreign communication from a related counterpart application dated Apr. 16, 2004.
Foreign communication from a related counterpart application dated Jul. 27, 2004.
Halliburton brochure entitled "Super CBL Additive Cement Additive" dated 1999.
Halliburton brochure entitled "MicorBond Expanding Additive for Cement" dated 1999.
Halliburton brochure entitled "Flexplug Service Stop Lost Circuation, Hold Your Bottom Line" dated 1998.
Halliburton brochure entitiled "FlexPlug® Service".
Halliburton brochure entitled "FlexPlug® W Lost-circulation Material" dated 2004.
Halliburton brochure entitled "FlexPlug® OBM Lost-Circulation Material" dated 2004.
Halliburton brochure entitled CFR-3™ Cement Friction Reducer Dispersant' dated 2004.
Halliburton brochure entitled Hydro-Chek Service—MOC/One Slurry for Selective Water Control.
Halliburton brochure entitled "Accolade™ Drilling Fluid Exceeds New GOM Environmental Standards and Boosts Performance" dated 2002.
Baroid Fluid Services brochure entitled "ADAPTA™ HPHT Filtration Reducer" dated 2005.
Baroid Fluid Services brochure entitled "AQUAGEL® Viscosifier" dated 2005.
Baroid Fluid Services brochure entitled "BARACARB® Bridging Agent" dated 2005.
Baroid Fluid Services brochure entitled "BARAZAN® D Viscosifier/Suspension Agent" dated 2005.
Baroid Fluid Services brochure entitiled "BARAZAN® D Plus Viscosifier//Suspension Agent" dated 2005.
Baroid Fluid Services brochure entitled "CARBONOX® Filtration Control Agent" dated 2005.
Baroid Fluid Services brochure entitled "CLAY GRABBER® Flocculant" dated 2005.
Baroid Fluid Services brochure entitled "CLAYSEAL® Shale Stabilizer" dated 2005.
Baroid Fluid Services brochure entitled "CLAY SYNC™ Shale Stabilizer" dated 2005.
Baroid Fluid Services brochure entitled "COLDTROL® Thinber" dated 2005.
Baroid Fluid Services brochure entitled "DURATONE® E Filtration Control Agent" dated 2005.
Baroid Fluid Services brochure entitled "DURATONE® HT Filtration Control Agent" dated 2005.
Baroid Fluid Services brochure entitled "EZ MUL® NT Emulsifier" dated 2005.
Baroid Fluid Services brochure entitled "FILTER-CHCK™ Filtration Control Agent" dated 2005.
Baroid Fluid Services brochure entitiled "GELTONE® Viscosifier" dated 2005.
Baroid Fluid Services brochure entitled "GELTONE® II Viscosifier" dated 2005.
Baroid Fluid Services brochure entitled "GELTONE® IV Viscosifier" dated 2005.
Baroid Fluid Services brochure entitled "GELTONE® V Viscosifier" dated 2005.
Baroid Fluid Services brochure entitled "GEM™ 2000 Shale Stabilizer" dated 2005.
Baroid Fluid Services brochure entitled "GEM™ Shale Stabilizer" dated 2005.
Baroid Fluid Services brochure entitled "GEM™ GP Shale Stabilizer" dated 2005.
Baroid Fluid Services brochure entitled "QUIK-THIN® Thinner" dated 2005.
Baroid Fluid Services brochure entitled "RHEMOD™ L Viscosifier/Suspension Agent" dated 2005.
Baroid Fluid Services brochure entitled "STEELSEAL® Lost Circulation Material" dated 2005.
Baroid Fluid Services brochure entitiled "SUSPENTONE™ Suspension Agent" dated 2005.
Baroid Fluid Services brochure entitled "LE™ SUPERMUL Emulsifier" dated 2005.
Smith, Richard et al., "Coordinated optimization, new well design reduce wellbore stability problems in Valhall Field," Oil & Gas Journal, 2004.
"Halliburton's solution to highly reactive clay formation challenges," technology Hydro-Guard, 2004.
"Halliburton's solution to highly reactive clay formation challenges," PetroMin, 2002.
Creel, Prentice et al., "Methods of Using a Swelling Agent In A Wellbore" filed Oct. 21, 2004 as U.S. Appl. No. 10/970,444.
Santra, Ashok et al., "Methods of Generating A Gas In a Plugging Composition to Improve Its Sealing Ability In a Downhole . . . " filed Oct. 18, 2004 as U.S. Appl. No. 10/967,121.
Roddy, Craig et al., "Compositions and Methods for the Delivery of Chemical Components in Subterranean Well Bores" filed Jan. 30, 2004 as U.S. Appl. No. 10/768,323.
Roddy, Craig et al., "Contained Micro-Particles for Use In Well Bore Operations" filed Jan. 30, 2004 as U.S. Appl. No. 10/768,864.
West, Gary et al., "Inhibitive Water-Based Drilling Fluid System and Method for Drilling Sands and Other Water-Sensitive . . . " filed Apr. 24, 2004 as U.S. Appl. No. 10/831,668.
Baroid Fluid Services brochure entitled "GEM(TM) CP Shale Stablilzer," Apr. 2005, 2 pages, Halliburton.
Derwent Abstract No. 1983-704150, abstract of Soviet Union Patent Publication No. SU 953187 published on Aug. 23, 1982.
Derwent Abstract No. 1992-072444, abstract of South Africa Patent Publication No. ZA 9100876A published on Dec. 24, 1991.
Derwent Abstract No. 1998-519099, abstract of Russian Patent Publication No. 2107158 C1 published on Mar. 20, 1998.
Derwent Abstract No. 2001-180538, abstract of Russian Patent Publication No. 2160822 C2 published on Dec. 20, 2000.
Derwent Abstract No. 2002-525993, abstract of Russian Patent Publication No. 2183264 C2 published on Jun. 10, 2002.
Foreign Communication from a related counterpart application—International Search Report and Written Opinion, PCT/GB2006/002659, Oct. 12, 2006, 11 pages.
Foreign Communication from a related counterpart application—International Search Report and Written Opinion, PCT/GB2004/000411, Jun. 16, 2004, 6 pages.
Halliburton brochure entitled "FlexPlug® Service: Helps Operator Solve Lost Circulation Problems Quickly and Effectively," 1998, 3 pages, Halliburton Energy Services, Inc.

Office Action dated Dec. 22, 2003 (9 pages), U.S. Appl. No. 10/375,183, filed Feb. 27, 2003.
Office Action dated Nov. 17, 2004 (16 pages), U.S. Appl. No. 10/375,183, filed Feb. 27, 2003.
Office Action dated Apr. 19, 2005 (11 pages), U.S. Appl. No. 10/375,183, filed Feb. 27, 2003.
Office Action (Final) dated Aug. 29, 2005 (22 pages), U.S. Appl. No. 10/375,183, filed Feb. 27, 2003.
Office Action dated Aug. 29, 2007 (36 pages), U.S. Appl. No. 10/375,183, filed Feb. 27, 2003.
Office Action (Final) dated Jan. 14, 2008 (7 pages), U.S. Appl. No. 10/375,183, filed Feb. 27, 2003.
Office Action dated Mar. 17, 2004 (9 pages), U.S. Appl. No. 10/375,205, filed Feb. 27, 2003.
Office Action dated Jul. 29, 2004 (8 pages), U.S. Appl. No. 10/375,206, filed Feb. 27, 2003.
Office Action dated Jan. 31, 2005 (14 pages), U.S. Appl. No. 10/375,206, filed Feb. 27, 2003.
Office Action dated Apr. 10, 2007 (28 pages), U.S. Appl. No. 10/967,121, filed Oct. 18, 2004.
Office Action dated Oct. 10, 2007 (9 pages), U.S. Appl. No. 10/967,121, filed Oct. 18, 2004.
Office Action (Final) dated Apr. 4, 2008 (9 pages), U.S. Appl. No. 10/967,121, filed Oct. 18, 2004.
Office Action dated Apr. 11, 2007 (24 pages), U.S. Appl. No. 11/090,496, filed Mar. 25, 2005.
Office Action dated Oct. 18, 2007 (6 pages), U.S. Appl. No. 11/090,496, filed Mar. 25, 2005.
Office Action dated Jan. 26, 2007 (24 pages), U.S. Appl. No. 11/180,767, filed Jul. 13, 2005.
Office Action dated Aug. 23, 2007 (6 pages), U.S. Appl. No. 11/180,767, filed Jul. 13, 2005.
Translation of Russian Patent Publication No. RU 2107158 C1 published on Mar. 20, 1998.
Translation of Russian Patent Publication No. RU 2160822 C2 published on Dec. 20, 2000.
Translation of Russian Patent Publication No. RU 2183264 C2 published on Jun. 10, 2002.
Office Action dated May 13, 2008 (8 pages), U.S. Appl. No. 11/180,767, filed Jul. 13, 2005.
Office Action dated May 14, 2008 (11 pages), U.S. Appl. No. 11/090,496, filed Mar. 25, 2005.
Office Action dated Jun. 30, 2008 (20 pages), U.S. Appl. No. 10/967,121, filed Oct. 18, 2004.
Office Action dated Jul. 25, 2008 (5 pages), U.S. Appl. No. 10/375,183, filed Feb. 27, 2003.
Office Action dated Apr. 10, 2009 (14 pages), U.S. Appl. No. 11/180,767, filed Jul. 13, 2005.
Office Action dated Jun. 9, 2009 (10 pages), U.S. Appl. No. 11/090,496, filed Mar. 25, 2005.
Derwent Abstract No. 2001-180538, abstract of Russian Patent Publication No. 2160822 C2, 2009, 2 pages, Derwent Information Ltd.
Foreign communication from a related counterpart application—International Preliminary Report on Patentability, PCT/EP2004/005479, Aug. 30, 2005, 7 pages.
Foreign communication from a related counterpart application—International Search Report and Written Opinion, PCT/EP2004/005479, Sep. 30, 2004, 8 pages.

* cited by examiner

METHODS OF USING A SWELLING AGENT IN A WELLBORE

CROSS-REFERENCE TO RELATED APPLICATIONS

Related copending applications are U.S. patent application Ser. No. 10/375,183 filed Feb. 27, 2003, entitled "Compositions and Methods of Cementing in Subterranean Formations Using a Swelling Agent to Inhibit the Influx of Water into a Cement Slurry", U.S. patent application Ser. No. 10/375,206 filed Feb. 27, 2003, entitled "A Method of Using a Swelling Agent to Prevent a Cement Slurry from being Lost to a Subterranean Formation", and U.S. patent application Ser. No. 10/375,205 filed Feb. 27, 2003, entitled "Methods for Passing a Swelling Agent into a Reservoir to Block Undesirable Flow Paths During Oil Production", each of which is incorporated by reference herein in its entirety.

FIELD OF THE INVENTION

The present invention generally relates to the recovery of materials from a subterranean formation, and more particularly to methods of displacing a swelling agent into a wellbore to maintain zonal isolation of a subterranean formation penetrated by the wellbore and/or to reduce the loss of a fluid to the formation.

BACKGROUND OF THE INVENTION

A natural resource such as oil or gas residing in a subterranean formation can be recovered by drilling a well into the formation. The subterranean formation is usually isolated from other formations using a technique known as well cementing. In particular, a wellbore is typically drilled down to the subterranean formation while circulating a drilling fluid through the wellbore. After the drilling is terminated, a string of pipe, e.g., casing, is run in the wellbore. Primary cementing is then usually performed whereby a cement slurry is pumped down through the string of pipe and into the annulus between the string of pipe and the walls of the wellbore to allow the cement slurry to set into an impermeable cement column and thereby seal the annulus. Subsequent secondary cementing operations, i.e., any cementing operation after the primary cementing operation, may also be performed. One example of a secondary cementing operation is squeeze cementing whereby a cement slurry is forced under pressure to areas of lost integrity in the annulus to seal off those areas.

Subsequently, oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation may be increased by hydraulically fracturing the formation. That is, a viscous fracturing fluid may pumped down the casing to the formation at a rate and a pressure sufficient to form fractures that extend into the formation, providing additional pathways through which the oil or gas can flow to the well. Unfortunately, water rather than oil or gas may eventually be produced by the formation through the fractures therein. To provide for the production of more oil or gas, a fracturing fluid may again be pumped into the formation to form additional fractures therein. However, the previously used fractures first must be plugged to prevent the loss of the fracturing fluid into the formation via those fractures.

In addition to the fracturing fluid, other fluids used in servicing a wellbore may also be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. As a result, the service provided by such fluid is more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation.

The isolation of the subterranean formation may be compromised by permeable zones present in the annulus and/or the wall of the casing in the wellbore. Permeable zones such as voids in the cement column placed in the annulus may result from an incomplete fill in of the annulus during primary cementing. Permeable zones may also be caused by the expansion and contraction of the casing and the cement column due to cyclical changes in underground pressures and temperatures during the life of the well. Moreover, the cement column may experience impacts and shocks generated by subsequent drilling, pressure testing, hydraulic fracturing, or other well operations. Unfortunately, conventional cement suffers from the drawback of being brittle and fragile and thus often cannot sustain such stress. Consequently, cracks or voids may form in the cement column and/or the casing wall. Further, microannuli may form between the cement column and the casing and between the cement column and the subterranean formation. Fluids may undesirably migrate through the microannuli, the voids or cracks in the cement column, and/or the voids or cracks in the casing wall such that the subterranean formation is no longer isolated from other subterranean formations.

Accordingly, a need exists to develop methods for maintaining the isolation of a subterranean formation after the completion of an adjacent wellbore and for reducing the loss of fluid into the formation. It is therefore desirable to devise ways of blocking the flow of fluid through pathways such as fractures filled with water, loss circulation zones in the subterranean formation, voids or cracks in the cement column and the casing, and so forth.

SUMMARY OF THE INVENTION

In an embodiment, methods of servicing a completed wellbore that penetrates a subterranean formation include displacing a sealant composition comprising a swelling agent into the wellbore to maintain isolation of the subterranean formation. The sealant composition may be displaced into a permeable zone such as a void or crack through which fluid can undesirably migrate. The permeable zone may be located in a conduit in the wellbore, a sealant column in an annulus of the wellbore, a microannulus of the wellbore, or combinations thereof. The swelling agent contacts water while in the wellbore such that it swells and thereby reduces fluid flow through the permeable zone. The swelling agent may comprise, for example, a carrier fluid and a crosslinked polymer having a diameter greater than or equal to about 0.01 mm in size. It may also include a swell time lengthening additive such as a salt.

In another embodiment, methods of servicing a wellbore that penetrates a subterranean formation include displacing a sealant composition comprising a swelling agent into the wellbore to reduce a loss of a fluid to the formation during circulation of the fluid in the wellbore. The fluid may be, for example, a drilling fluid, a secondary sealant composition, a fracturing fluid, or combinations thereof. The sealant composition may be displaced into a flow pathway through which fluid can undesirably migrate into the formation. The swelling agent contacts water while in the formation such that it swells and thereby reduces fluid flow through the permeable zone. The swelling agent may comprise, for example, a carrier fluid and a crosslinked polymer having a diameter greater than or equal to about 0.01 mm in size. It may also include a swell time lengthening additive such as a salt. In an embodiment, the sealant composition may include a reinforcing composition such as sodium or potassium silicate and an activator that is capable of converting sodium silicate into silica gel.

DETAILED DESCRIPTION OF THE PREFERRED EMBODIMENTS

According to an embodiment, a sealant composition comprising a swelling agent is pumped into one or more permeable zones in a wellbore through which fluids such as water can undesirably migrate. This placement of the sealant composition in the permeable zones may occur during, for example, a secondary or remedial operation typically performed after completion of the wellbore, i.e., after the annulus of the wellbore has been sealed by a sealant composition such as via primary cementing. Such permeable zones may be present in, for example, the wall of a conduit disposed in the wellbore such as a casing, a sealant/cement column disposed in an annulus of the wellbore between the casing and a subterranean formation penetrated by the wellbore, a microannulus interposed between the casing and the sealant/cement column, a microannulus interposed between the sealant/cement column and the formation, or combinations thereof. Examples of such permeable zones include a fissure, a crack, a fracture, a flow channel, a void, a perforation formed by a perforating gun, casing failures involving corrosion pitting, casing failures involving mechanical forces, casing failures involving hydraulic pressure overloads, or combinations thereof. Examples of such secondary or remedial operations include squeeze cementing, hydraulic fracturing, matrix acidizing, fracture acidizing, chemical squeezing, mechanical devices to (seal-off, block, or isolate sections of wellbores), expanding devices (metallic or elastic), filtercake removing treatments, etc.

Within the permeable zones, the swelling agent contacts water. Such water may be produced by the subterranean formation, pumped into the wellbore as the carrier fluid of the swelling agent, and/or pumped into the wellbore after the sealant composition. As a result of such contact, the swelling agent typically absorbs the water and swells to form an impermeable mass that blocks the flow of fluid through the permeable zones. Therefore, the sealant composition serves to maintain the isolation of the subterranean formation from other formations despite the development of the permeable zones in the wellbore. Otherwise, fluids might be able to undesirably flow into or out of the formation via the permeable zones.

According to another embodiment, the sealant composition comprising the swelling agent is pumped down a wellbore and into one or more flow pathways that pass into a subterranean formation penetrated by the wellbore. The swelling agent contacts water that may be produced by the subterranean formation, pumped into the wellbore as the carrier fluid of the swelling agent, or pumped into the wellbore after the sealant composition. As a result, the swelling agent absorbs the water, grows in size, and forms an impermeable mass that can plug the flow pathways into the subterranean formation, thus forming a barrier to fluid that could undesirably migrate into the formation. As a result, fluids may be circulated in the wellbore for the purpose of servicing the wellbore without being concerned that they could flow into and be lost to the formation. In an embodiment, the sealant composition is displaced into the flow pathways prior to circulating the servicing fluid. Alternatively, the sealant composition may be displaced into the flow pathways concurrently with circulating the servicing fluid, for example, by adding the sealant composition to the servicing fluid and/or by alternatively pulse injecting the sealant composition and the servicing fluid. Examples of the flow pathways that the swelling agent could be used to plug include loss-circulation zones having natural or induced fractures, depleted zones, zones of relatively low pressure, weak zones having fracture gradients exceeded by the hydrostatic pressure of the fluid being used to service the wellbore, perforations formed by a perforating gun, casing failures involving corrosion pitting, casing failures involving mechanical forces, casing failures involving hydraulic pressure overloads, or combinations thereof.

In one embodiment, the swelling agent may be used to reduce a pre-completion loss to a subterranean formation. As used herein, a pre-completion loss refers to a loss of fluid to a subterranean formation that occurs before the wellbore is completed, i.e., before the annulus of the wellbore has been sealed by a sealant composition, e.g., cement via primary cementing. In an embodiment, the pre-completion loss occurs during the completion of the wellbore. In an embodiment, the pre-completion loss is the loss of a drilling fluid during its circulation through a wellbore both during and after the drilling of the wellbore.

In another embodiment, the swelling agent may be used to prevent a post-completion loss to the subterranean formation. As used herein, a post-completion loss refers to a loss of fluid to a subterranean formation that occurs after the wellbore is completed, i.e., after the annulus of the wellbore has been sealed by a sealant composition, e.g., cement via primary cementing. In an embodiment, the post-completion loss may be that of a fracturing fluid. By way of example, the fracturing fluid may be pumped into a wellbore to further fracture a subterranean formation containing pre-existing fractures that are no longer useful due to being depleted of oil or gas and/or being at least partially filled with unwanted water. Thus, the swelling agent may be strategically placed in such pre-existing fractures to reduce the loss of the fracturing fluid to the subterranean formation, thus ensuring that a sufficient amount of fracturing fluid is available to create additional fractures in the formation. Alternatively, all or a portion of the pre-existing fractures may be sealed and the well may be re-perforated and subsequently fractured.

In another embodiment, the post-completion loss may be that of a secondary sealant composition such as a cement composition. By way of example, the secondary sealant composition may be placed in one or more permeable zones present in the wellbore using a squeeze technique known in the art. The permeable zones may, for example, extend through the wall of a conduit positioned in the wellbore, a sealant/cement column in the annulus of the wellbore, a microannulus of the wellbore, or combinations thereof. Examples of those permeable zones include a fissure, a crack, a fracture, a flow channel, a void, or combinations thereof. By placing the swelling agent in flow pathways that enter the subterranean formation, the secondary sealant composition is less likely to be lost to the formation while being circulated in the wellbore.

Other remedial/post completion techniques where utilization of the swelling agent could be incorporated would be as (1) a diversion of injected fluids during stimulation processes such as fracture acidizing, matrix acidizing, chemical treatments, filtercake cleaning treatments, and hydraulic fracturing, (2) providing steps of diversion by contact between the swelling agent and following fluids in attempts to seal off fractures and highly vugular conditions at near-wellbore intervals, and (3) barrier building due to the accumulated affects of swollen swelling agent within large vugular tunnels.

The methods described above for maintaining the isolation of a subterranean formation and reducing the loss of fluid to the formation utilize a sealant composition that includes a swelling agent. As used herein, the swelling agent is defined as a material that is capable of absorbing water and swelling, i.e., increases in size, as it absorbs the water. The amount of the swelling agent present in the sealant composition may be in a range of from about 0.001 ppg (pounds per gallon) to about 5 ppg and is preferably about 0.5 ppg. In an embodiment, the swelling agent is insoluble in water and thus avoids becoming diluted and washed away by aqueous fluids flowing through the wellbore. In an embodiment, the swelling agent forms a gel mass upon swelling effective for blocking a flow path of fluid. In an embodiment, the gel mass has a relatively low permeability to fluids used to service a wellbore such as a drilling fluid, a fracturing fluid, a sealant composition (e.g. cement), an acidizing fluid, an injectant, etc., thus creating a barrier to the flow of such fluids. A gel is herein defined as a crosslinked polymer network swollen in a liquid. The crosslinker is usually part of the polymer and thus will not leach out of the swelling agent.

Suitable swelling agents include superabsorbents, which are commonly used in absorbent products such as water retaining horticultural products, diapers, training pants, and feminine care products. Superabsorbents are swellable crosslinked polymers that have the ability to absorb and store many times their own weight of aqueous liquids by forming a gel. The superabsorbents retain the liquid that they absorb and typically do not release the liquid, even under pressure. Examples of superabsorbents include sodium acrylate-based polymers having three dimensional, network-like molecular structures. The polymer chains are formed by the reaction/joining of millions of identical units of acrylic acid monomer, which have been substantially neutralized with sodium hydroxide (caustic soda). Crosslinking chemicals tie the chains together to form a three-dimensional network, enabling the superabsorbents to absorb water or water-based solutions into the spaces in the molecular network, and thus forming a gel and locking up the liquid. Additional examples of suitable swelling agents comprise crosslinked polyacrylamide; crosslinked polyacrylate; crosslinked hydrolyzed polyacrylonitrile; salts of carboxyalkyl starch, for example, salts of carboxymethyl starch; salts of carboxyalkyl cellulose, for example, salts of carboxymethyl cellulose; salts of any crosslinked carboxyalkyl polysaccharide; crosslinked copolymers of acrylamide and acrylate monomers; starch grafted with acrylonitrile and acrylate monomers; crosslinked polymers of two or more of allylsulfonate, 2-acrylamido-2-methyl-1-propanesulfonic acid, 3-allyloxy-2-hydroxy-1-propane-sulfonic acid, acrylamide, and acrylic acid monomers; or combinations thereof. In one embodiment, the swelling agents absorbs not only many times its weight of water but also increases in volume upon absorption of water many times the volume of the dry material.

In an embodiment, the swelling agent is a dehydrated, crystalline (i.e., solid) polymer. In a preferred embodiment, the crystalline polymer is a crosslinked polymer. In a more preferred embodiment, the crosslinked polymer is a crosslinked polyacrylamide in the form of a hard crystal. A suitable crosslinked polyacrylamide is DIAMOND SEAL polymer available from Baroid Drilling Fluids, Inc., a Halliburton Company, Houston, Tex. The DIAMOND SEAL polymer is available in grind sizes of 1 mm, 4 mm, and 14 mm. The DIAMOND SEAL polymer possesses certain qualities that make it an exceptional swelling agent. For example, the DIAMOND SEAL polymer is water-insoluble and is resistant to deterioration by carbon dioxide, bacteria, and subterranean minerals. Further, the DIAMOND SEAL polymer can withstand temperatures up to at least 250° F. without experiencing breakdown and thus may be used in the majority of locations where oil reservoirs are found. An example of a biodegradable starch backbone grafted with acrylonitrile and acrylate is commercially available from Grain Processing Corporation of Muscantine, Iowa under the tradename WATER LOCK. Other suitable swelling agents are described in European Patent No. 0 566 118, which is incorporated by reference herein.

As mentioned previously, the swelling agent absorbs water and is thus physically attracted to water molecules. In the case where the swelling agent is a crystalline crosslinked polymer, the polymer chain deflects and surrounds the water molecules during water absorption. In effect, the polymer undergoes a change from that of a dehydrated crystal to that of a hydrated gel as it absorbs water. Once fully hydrated, the gel usually exhibits a high resistance to the migration of water due to its polymer chain entanglement and its relatively high viscosity. The gel can plug permeable zones and flow pathways because it can withstand substantial amounts of pressure without being dislodged or extruded.

In an embodiment, the swelling agent has a particle size (i.e., diameter) of greater than or equal to about 0.01 mm, alternatively greater than or equal to about 0.25 mm, alternatively less than or equal to about 14 mm, before it absorbs water (i.e., in its solid form). The use of the swelling agent having this larger particle size ensures that the swelling agent is less likely to migrate deep into the subterranean formation before being contacted with an aqueous solution to cause it to swell. The flow pathways in the formation thus can be plugged near the surface of the formation, thus preventing the loss of wellbore servicing fluids into the formation. Further, the larger particle size of the swelling agent allows it to be placed in permeable zones in the wellbore, which are typically greater than about 1 mm in diameter. As the swelling agent undergoes hydration, its physical size increases by about 10 to 800 times its original weight. The resulting size of the swelling agent is thus large enough to plug flow pathways in the formation and permeable zones in the wellbore such that fluids cannot undesirably migrate therethrough. The amount and rate by which the swelling agent increases in size vary depending upon its temperature, its grain size, and the ionic strength of the carrier fluid. The temperature of a well generally increases from top to bottom such that the rate of swelling increases as the swelling agent passes downhole. The rate of swelling also increases as the particle size of the swelling agent decreases and as the ionic strength of the carrier fluid decreases.

In addition to the swelling agent, the sealant compositions typically include a sufficient amount of carrier fluid to render the compositions pumpable such that the swelling agent may be moved to desired locations in a wellbore. Examples of suitable carrier fluids with which the swelling agent may be combined include fresh water, brine water of varying salinity, hydrocarbons such as produced oil and diesel oil, synthetic fluids such as ester or polymer based fluids, and combinations thereof. The preferred concentration range for the swelling agent in the carrier fluid is from about 0.01 to about 5 pounds per gallon of the carrier, preferably about 0.5 pound per gallon of carrier fluid.

In an embodiment, the sealant compositions may further include a swell time lengthening additive, which is herein defined as a material that is capable of increasing the swell time prior to the swelling of the swelling agent. As used herein, the swell time is defined as the time required for the swelling agent to change from a solid state to a fully hydrated gel. Without intending to be limited by theory, it is believed that the swell time lengthening agent, depending on its type and amount, screens to different degrees the anionic or water binding sites in the polymer structure of the swelling agent from hydrating by water molecules. The presence of the swell time lengthening additive when used in the carrier fluid with the sealant compositions ensures that there is a sufficient amount of time to place the swelling agent in the flow pathways and/or permeable zones downhole before it swells to a size too large to fit therein. The use of the swell time lengthening additive also allows for a higher concentration of swelling agent to be employed in the sealant compositions if desired. In an embodiment, the swell time lengthening additive is used in a fresh water carrier fluid. Examples of swell time lengthening agents include one or more monovalent and divalent salts such as acetate, silicate, aluminate, chloride, nitrate, sulfate, phosphate salts of alkali or alkaline earth metals. Such salts may be used in amounts ranging from about 10% to about 100% of the saturation concentrations of the salts when dissolved in fresh water.

The swell time of the swelling agent when used in combination with the swell time lengthening additive and fresh water may be in a range of from about 5 minutes to about 16 hours, alternatively in a range of from about 1 hour to about 16 hours. The amount of swell time lengthening additive present in a sealant composition may be effective to increase a swell time of the swelling agent to greater than or equal to about 1 hour. For example, the amount of a swell time lengthening additive such as sodium chloride present in the sealant composition may be in a range of from about 10% to about 100% of the saturation concentration of the swelling time lengthening agent in water, more preferably in a range of from about 33% to about 67%, or most preferably about 50%. In an embodiment, the placement of the swelling agent is followed by displacement with additional fresh water or water with levels of salinity less than that used in the carrier fluid to allow for additional swelling of the swelling agent in situ to allow for improved sealing of the zone against fluid flow.

In another embodiment, the sealant composition comprises a reinforcing composition that enhances the sealant effectiveness of the swelling agent by forming a gelled matrix upon placement in the zone of interest. The gelled matrix containing the swelling agent provides enhanced mechanical integrity and reinforcement to the sealant composition during and after swelling. The reinforcing composition comprises a reinforcing agent, e.g., a water soluble salt, that is capable of forming an insoluble gel upon reaction with an activator. Examples of reinforcing agents include an alkali metal metasilicate compound, an alkali metal silicate compound, an alkali metal aluminate, or combinations thereof. In an embodiment, the reinforcing agent comprises sodium silicate, potassium silicate, sodium aluminate, or combinations thereof, preferably sodium silicate. Reaction of the activator and the reinforcing agent, for example sodium silicate, forms an insoluble silica gel or metal silicate matrix. Such gel incorporating the swollen swelling agent provides for a strong and rubbery sealant composition. Examples of activators include, ethyl acetate, urea, sugar, sodium acid pyrophosphate, chloride, acetate and nitrate salts of alkali and alkaline earth metals, or combinations thereof. Such activators may be added to the carrier fluid or contacted with the sealant composition containing the reinforcing agent after placement in the zone of interest.

The sealant compositions may further include additional additives as deemed appropriate by those skilled in the art. The different components in the sealant compositions may be combined in any suitable order and blended together before being displaced into a wellbore.

EXAMPLES

Example 1

As shown in Tables 1, different concentrations of swelling agent available from Baroid Drilling Fluids, a Halliburton Company, Houston, Tex. as DIAMOND SEAL co-polymer having a particle size of 4 mm were combined with solutions containing various weight ratios of a 45% solution of sodium silicate available from Halliburton Energy Services, Inc. as FLOCHEK-A and fresh water to form several test samples. The samples were then subjected to a temperature in a range of from about 75° F. to about 95° F. and observed to determine the swelling time and the amount of swelling of the DIAMOND SEAL polymer. Table 1 below shows the results of this test.

TABLE 1

| | | Tests @ 75-95° F. | | | | |
|---|---|---|---|---|---|---|
| Concentration of Co-Polymer (Pounds per Gallon of Solution) | Absorption Time Using 100% Liquid Sodium Silicate (Hr:Min) | Absorption Time Using 75:25 Volume Ratio of Sodium Silicate:Fresh Water (Hr:Min) | Absorption Time Using 67:33 Volume Ratio of Sodium Silicate:Fresh Water (Hr:Min) | Absorption Time Using 50:50 Volume Ratio of Sodium Silicate:Fresh Water (Hr:Min) | Absorption Time Using 33:67 Volume Ratio of Sodium Silicate:Fresh Water (Hr:Min) | Absorption Time Using 25:75 Volume Ratio of Sodium Silicate:Fresh Water (Hr:Min) |
| 0.10 | 6:00+ | 4:00+ | 3:30+ | 2:20 | 1:55 | 0:50 |
| 0.20 | 6:00+ | 4:00+ | 3:30+ | 2:23 | 1:56 | 0:55 |
| 0.30 | 6:00+ | 4:00+ | 3:30+ | 2:25 | 1:58 | 0:57 |
| 0.40 | 6:00+ | 4:00+ | 3:30+ | 2:27 | 1:59 | 0:59 |
| 0.50 | 6:00+ | 4:00+ | 3:30+ | 2:30 | 2:00 | 1:00 |

Example 2

Test samples were formed in the same manner as those formed in Example 1. The samples were then subjected to a temperature of about 125° F. and observed to determine the swelling time and the amount of swelling of the DIAMOND SEAL polymer. Table 2 below shows the results of this test.

TABLE 2

Tests @ 125° F.

| Concentration of Co-Polymer (Pounds per Gallon of Solution) | Absorption Time Using 100% Liquid Sodium Silicate (Hr:Min) | Absorption Time Using 75:25 Volume Ratio of Sodium Silicate:Fresh Water (Hr:Min) | Absorption Time Using 67:33 Volume Ratio of Sodium Silicate:Fresh Water (Hr:Min) | Absorption Time Using 50:50 Volume Ratio of Sodium Silicate:Fresh Water (Hr:Min) | Absorption Time Using 33:67 Volume Ratio of Sodium Silicate:Fresh Water (Hr:Min) | Absorption Time Using 25:75 Volume Ratio of Sodium Silicate:Fresh Water (Hr:Min) |
|---|---|---|---|---|---|---|
| 0.10 | 6:00+ | 3:30+ | 2:30+ | 1:20 | 1:00 | 0:42 |
| 0.20 | 6:00+ | 3:30+ | 2:30+ | 1:23 | 1:08 | 0:43 |
| 0.30 | 6:00+ | 3:30+ | 2:30+ | 1:25 | 1:11 | 0:44 |
| 0.40 | 6:00+ | 3:30+ | 2:30+ | 1:27 | 1:13 | 0:44 |
| 0.50 | 6:00+ | 3:30+ | 2:30+ | 1:30 | 1:15 | 0:45 |

Based on the results in Tables 1 and 2, the swelling time of the DIAMOND SEAL polymer varied depending on the ratio of sodium silicate to fresh water in each sample. In addition, the swelling time of the polymer generally decreased as the temperature increased.

Example 3

Test samples were formed in the same manner as those formed in Example 2. They were then contacted with additional fresh water, followed by observing them at a temperature of about 125° F. to determine the amount of swelling that occurred. As shown in Table 3 below, the ratios of the swelling of these test samples with additional water added compared to the swelling of the test samples without additional water (Example 2) were determined based on the volume amount of swelling observed. This example illustrates the ability of the DIAMOND SEAL polymer to swell when contacted with additional fresh water following placement into the well's intervals while being transported in the initial carrier fluid.

TABLE 3

Tests @ 125° F.

| Concentration of Co-Polymer (Pounds per Gallon of Solution) | Swelling Ratio Using 100% Sodium Silicate | Swelling Ratio Using 75:25 Volume Ratio of Sodium Silicate:Fresh Water | Swelling Ratio Using 67:33 Volume Ratio of Sodium Silicate:Fresh Water | Swelling Ratio Using 50:50 Volume Ratio of Sodium Silicate:Fresh Water | Swelling Ratio Using 33:67 Volume Ratio of Sodium Silicate:Fresh Water | Swelling Ratio Using 25:75 Volume Ratio of Sodium Silicate:Fresh Water |
|---|---|---|---|---|---|---|
| 0.10 | 1.5:1 | 5:1 | 10:1 | 20:1 | 25:1 | 50:1 |
| 0.20 | 1.2:1 | 5:1 | 10:1 | 20:1 | 25:1 | 50:1 |
| 0.30 | 1:1 | 5:1 | 10:1 | 20:1 | 25:1 | 50:1 |
| 0.40 | 1:1 | 5:1 | 10:1 | 20:1 | 25:1 | 50:1 |
| 0.50 | 1:1 | 5:1 | 10:1 | 20:1 | 25:1 | 50:1 |

Example 4

Test samples were formed in the same manner as those formed in Example 2. They were then contacted with a solution containing an equal volume of fresh water and an activator (CaCl$_2$) at a mixture of 10% (0.926 lbs. CaCl$_2$/gal fresh water). The carrier fluid containing the sealing agent was combined with an equal volume of the 10% CaCl$_2$ solution in a beaker and shook to mix. The samples were then observed at a temperature of about 125° F. to determine the amount of swelling that occurred. As shown in Table 4 below, the ratios of the swelling of these test samples with an addition of an equal volume of 10% CaCl$_2$ water compared to the swelling of the test samples without the additional CaCl$_2$ water (Example 2) were determined based on the amount of swelling observed.

TABLE 4

Tests @ 125° F.

| Concentration of Co-Polymer (Pounds per Gallon of Solution) | Swelling Ratio Using 100% Sodium Silicate | Swelling Ratio Using 75:25 Volume Ratio of Sodium Silicate:Fresh Water | Swelling Ratio Using 67:33 Volume Ratio of Sodium Silicate:Fresh Water | Swelling Ratio Using 50:50 Volume Ratio of Sodium Silicate:Fresh Water | Swelling Ratio Using 33:67 Volume Ratio of Sodium Silicate:Fresh Water | Swelling Ratio Using 25:75 Volume Ratio of Sodium Silicate:Fresh Water |
|---|---|---|---|---|---|---|
| 0.10 | 25:1 | 50:1 | 100:1 | 180:1 | 210:1 | 250:1 |
| 0.20 | 22:1 | 55:1 | 110:1 | 190:1 | 210:1 | 260:1 |
| 0.30 | 20:1 | 55:1 | 115:1 | 200:1 | 210:1 | 260:1 |
| 0.40 | 20:1 | 60:1 | 120:1 | 205:1 | 220:1 | 265:1 |
| 0.50 | 15:1 | 60:1 | 120:1 | 205:1 | 220:1 | 270:1 |

Based on the results shown in Tables 3 and 4, the amount of swelling of the DIAMOND SEAL co-polymer placed in the carrier solution increased when it was contacted with additional water. Further, its volume increase was much larger when mixed with additional water containing the activator that was reactive with the sodium silicate. This affect is theorized to be due to the release of water within the gel body caused by the conversion of soluble sodium silicate salt to insoluble calcium silicate solid thereby releasing water of hydration and making the released water available to the DIAMOND SEAL co-polymer for absorption.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore that penetrates a subterranean formation, comprising: placing a non-cementitious sealant composition comprising a swelling agent and a swell time lengthening additive for increasing a time prior to swelling of the swelling agent into the wellbore to reduce a loss of a fluid to the subterranean formation during placement of the fluid in the wellbore, wherein the loss is a pre-completion or post-completion loss and wherein the swelling agent comprises crosslinked hydrolyzed polvacrylonitrile, salts of carboxyalkyl cellulose, carboxyalkyl starch or any carboxyalkyl polysaccharide, starch grafted with acrylonitrile and acrylate monomers, or combinations thereof.

2. The method of claim 1 wherein the servicing comprises drilling the wellbore.

3. The method of claim 1, wherein the servicing comprises hydraulic fracturing.

4. The method of claim 1, wherein the fluid comprises a drilling fluid, a secondary sealant composition, a fracturing fluid, an acidizing fluid, an injectant, or combinations thereof.

5. The method of claim 1, wherein the sealant composition is placed in a flow pathway into the subterranean formation through which the fluid can undesirably migrate.

6. The method of claim 5, wherein the swelling agent contacts water such that it swells and thereby reduces fluid flow through the flow pathway.

7. The method of claim 1, wherein the swelling agent comprises a crosslinked polymer having a diameter greater than or equal to about 0.01 mm in size.

8. The method of claim 1, wherein the servicing comprises squeeze cementing.

9. The method of claim 1, wherein the swell time lengthening additive comprises one or more monovalent and divalent salts such as acetate, silicate, aluminate, chloride, nitrate, sulfate, phosphate salts of alkali or alkaline earth metals.

10. The method of claim 1, wherein the swell time lengthening additive comprises sodium silicate.

11. The method of claim 10, wherein the sealant composition further comprises calcium chloride.

12. The method of claim 1, wherein the sealant composition further comprises an activator selected from the group consisting of ethyl acetate, urea, sugar, sodium acid pyrophosphate, chloride, acetate and nitrate salts of alkali and alkaline earth metals, and combinations thereof.

13. A method of servicing a wellbore that penetrates a subterranean formation, comprising: placing a non-cementitious sealant composition comprising a swelling agent and a swell time lengthening additive for increasing a time prior to swelling of the swelling agent into the wellbore to reduce a loss of a fluid to the subterranean formation during placement of the fluid in the wellbore, wherein the sealant composition is placed with the placement of the fluid and wherein the swelling agent comprises crosslinked polyacrylamide and the swell time lengthening additive comprises sodium silicate.

14. The method of claim 13, wherein the sealant composition further comprises calcium chloride.

15. The method of claim 13, wherein the servicing comprises drilling the wellbore.

16. The method of claim 13, wherein the fluid comprises a drilling fluid, a secondary sealant composition, a fracturing fluid, an acidizing fluid, an injectant, or combinations thereof.

17. The method of claim 13, wherein the sealant composition is placed in a flow pathway into the subterranean formation through which the fluid can undesirably migrate.

18. The method of claim 17, wherein the swelling agent contacts water such that it swells and thereby reduces fluid flow through the flow pathway.

19. The method of claim 13, wherein the sealant composition further comprises an activator selected from the group consisting of ethyl acetate, urea, sugar, sodium acid pyrophosphate, chloride, acetate and nitrate salts of alkali and alkaline earth metals, and combinations thereof.

20. A method of servicing a wellbore that penetrates a subterranean formation, comprising: placing a non-cementitious sealant composition comprising a swelling agent into the wellbore to reduce a loss of a fluid to the subterranean formation during placement of the fluid in the wellbore, wherein the loss is a pre-completion or post-completion loss, wherein the servicing comprises squeeze cementing and wherein the swelling agent comprises crosslinked polyacrylamide and the swell time lengthening additive comprises sodium silicate.

21. The method of claim 20, wherein the sealant composition further comprises an activator selected from the group consisting of ethyl acetate, urea, sugar, sodium acid pyrophosphate, chloride, acetate and nitrate salts of alkali and alkaline earth metals, and combinations thereof.

22. The method of claim 20, wherein the sealant composition further comprises calcium chloride.

23. The method of claim 20, wherein the fluid comprises a drilling fluid, a secondary sealant composition, a fracturing fluid, an acidizing fluid, an injectant, or combinations thereof.

24. The method of claim 20, wherein the sealant composition is placed in a flow pathway into the subterranean formation through which the fluid can undesirably migrate.

25. The method of claim 24, wherein the swelling agent contacts water such that it swells and thereby reduces fluid flow through the flow pathway.

26. A method of servicing a wellbore that penetrates a subterranean formation, comprising: placing a non-cementitious sealant composition comprising a swelling agent, a reinforcing agent and an activator into the wellbore to reduce a loss of a fluid to the subterranean formation during placement of the fluid in the wellbore, wherein the swelling agent comprises crosslinked polyacrylamide, the reinforcing agent comprises sodium silicate, and the activator comprises calcium chloride.

27. The method of claim 26, wherein the sealant composition further comprises fresh water.

28. The method of claim 26, wherein an amount of the sodium silicate present in the sealant composition is in a range of from about 33% to about 67% by total volume of the sodium silicate and the fresh water combined.

29. The method of claim 26, wherein the servicing comprises drilling the wellbore.

30. The method of claim 26, wherein the fluid comprises a drilling fluid, a secondary sealant composition, a fracturing fluid, an acidizing fluid, an injectant, or combinations thereof.

31. The method of claim 26, wherein the sealant composition is placed in a flow pathway into the subterranean formation through which the fluid can undesirably migrate.

32. The method of claim 31, wherein the swelling agent contacts water such that it swells and thereby reduces fluid flow through the flow pathway.

33. A method of servicing a wellbore that penetrates a subterranean formation, comprising: placing a non-cementitious sealant composition comprising a swelling agent and a swell time lengthening additive for increasing a time prior to swelling of the swelling agent into the wellbore to reduce a loss of a fluid to the subterranean formation during placement of the fluid in the wellbore, wherein the sealant composition further comprises a carrier fluid and wherein the swelling agent comprises crosslinked polyacrylamide and the swell time lengthening additive comprises sodium silicate.

34. The method of claim 33, wherein the carrier fluid comprises a fresh water, a brine, a chloride solution, a hydrocarbon, a synthetic fluid, or combinations thereof.

35. The method of claim 33, wherein the sealant composition further comprises an activator selected from the group consisting of ethyl acetate, urea, sugar, sodium acid pyrophosphate, chloride, acetate and nitrate salts of alkali and alkaline earth metals, and combinations thereof.

36. The method of claim 33, wherein the sealant composition further comprises calcium chloride.

37. The method of claim 33, wherein the fluid comprises a drilling fluid, a secondary sealant composition, a fracturing fluid, an acidizing fluid, an injectant, or combinations thereof.

38. The method of claim 33, wherein the sealant composition is placed in a flow pathway into the subterranean formation through which the fluid can undesirably migrate.

39. The method of claim 38, wherein the swelling agent contacts water such that it swells and thereby reduces fluid flow through the flow pathway.

40. A method of servicing a wellbore that penetrates a subterranean formation, comprising: placing a non-cementitious sealant composition comprising fresh water, sodium silicate, calcium chloride and a swelling agent into the wellbore to reduce a loss of a fluid to the subterranean formation during placement of the fluid in the wellbore, wherein the sealant composition comprises a reinforcing agent selected from the group consisting of an alkali metal metasilicate compound, an alkali metal silicate compound, an alkali metal aluminate, and combinations thereof and an activator selected from the group consisting of ethyl acetate, urea, sugar, sodium acid pyrophosphate, chloride, acetate and nitrate salts of alkali and alkaline earth metals, and combinations thereof; and wherein an amount of the sodium silicate present in the sealant composition is in a range of from about 25% to about 75% by total volume of the sodium silicate and the fresh water combined.

41. The method of claim 40, wherein the fluid comprises a drilling fluid, a secondary sealant composition, a fracturing fluid, an acidizing fluid, an injectant, or combinations thereof.

42. The method of claim 40, wherein the sealant composition is placed in a flow pathway into the subterranean formation through which the fluid can undesirably migrate.

43. The method of claim 42, wherein the swelling agent contacts water such that it swells and thereby reduces fluid flow through the flow pathway.

44. A method of servicing a wellbore that penetrates a subterranean formation, comprising: placing a non-cementitious sealant composition comprising a swelling agent and a swell time lengthening additive for increasing a time prior to swelling of the swelling agent into the wellbore to reduce a loss of a fluid to the subterranean formation during placement of the fluid in the wellbore, wherein an amount of the swelling agent present in the sealant composition is in a range of from about 0.001 ppg to about 5 ppg and wherein the swelling agent comprises crosslinked polyacrylamide and the swell time lengthening additive comprises sodium silicate.

45. The method of claim 44, wherein the sealant composition further comprises an activator selected from the group consisting of ethyl acetate, urea, sugar, sodium acid pyrophosphate, chloride, acetate and nitrate salts of alkali and alkaline earth metals, and combinations thereof.

46. The method of claim 44, wherein the sealant composition further comprises calcium chloride.

47. A method of servicing a wellbore that penetrates a subterranean formation, comprising: placing a non-cementitious sealant composition comprising a swelling agent into the wellbore to reduce a loss of a fluid to the subterranean formation during placement of the fluid in the wellbore, wherein the sealant composition further comprises an effective amount of swell time lengthening additive to increase a swell time of the swelling agent to in a range of from about 5 minutes to about 16 hours and wherein the swelling agent comprises crosslinked polyacrylamide and the sealant composition further comprises sodium silicate.

48. The method of claim 47, wherein the sealant composition further comprises an effective amount of a swell time lengthening additive to increase a swell time of the swelling agent to in a range of from about 1 hour to about 16 hours.

49. The method of claim 47, wherein the sealant composition further comprises an activator selected from the group consisting of ethyl acetate, urea, sugar, sodium acid pyrophosphate, chloride, acetate and nitrate salts of alkali and alkaline earth metals, and combinations thereof.

50. The method of claim 47, wherein the sealant composition further comprises calcium chloride.

51. The method of claim 47, wherein the fluid comprises a drilling fluid, a secondary sealant composition, a fracturing fluid, an acidizing fluid, an injectant, or combinations thereof.

52. A method of servicing a completed wellbore that penetrates a subterranean formation, comprising: placing a non-cementitious sealant composition comprising a swelling agent and a swell time lengthening additive for increasing a time prior to swelling of the swelling agent into the wellbore to maintain isolation of the subterranean formation, wherein the servicing comprises squeeze cementing or hydraulic fracturing and wherein the swelling agent comprises crosslinked polyacrylamide and the swell time lengthening additive comprises sodium silicate.

53. The method of claim 52, wherein the sealant composition is placed into a permeable zone through which fluid can undesirably migrate.

54. The method of claim 53, wherein the permeable zone comprises a fissure, a crack, a fracture, a flow channel, a void, a perforation, or combinations thereof.

55. The method of claim 53, wherein the permeable zone is located in a conduit in the wellbore, a sealant column in an annulus of the wellbore, a microannulus of the wellbore, or combinations thereof.

56. The method of claim 53, wherein the swelling agent contacts water such that it swells and thereby reduces fluid flow through the permeable zone.

57. The method of claim 52, wherein the sealant composition further comprises an activator selected from the group consisting of ethyl acetate, urea, sugar, sodium acid pyrophosphate, chloride, acetate and nitrate salts of alkali and alkaline earth metals, and combinations thereof.

58. The method of claim 52, wherein the sealant composition further comprises calcium chloride.

59. A method of servicing a completed wellbore that penetrates a subterranean formation, comprising: placing a non-cementitious sealant composition comprising a swelling agent and a swell time lengthening additive for increasing a time prior to swelling of the swelling agent into the wellbore to maintain isolation of the subterranean formation, wherein the servicing comprises squeeze cementing or hydraulic fracturing and wherein the swelling agent comprises a crosslinked polymer having a diameter greater than or equal to about 0.01 mm in size.

60. A method of servicing a wellbore that penetrates a subterranean formation, comprising: placing a non-cementitious sealant composition comprising a swelling agent and a swell time lengthening additive for increasing a time prior to swelling of the swelling agent into the wellbore to reduce a loss of a fluid to the subterranean formation during placement of the fluid in the wellbore, wherein the loss is a pre-completion or post-completion loss and wherein the swelling agent comprises crosslinked polyacrylamide and the swell lengthening additive comprises sodium silicate.

61. The method of claim 60, wherein the sealant composition further comprises calcium chloride.

* * * * *